(12) United States Patent
Muckleroy

(10) Patent No.: US 6,802,282 B2
(45) Date of Patent: Oct. 12, 2004

(54) MULTI-FUNCTIONAL PET CARRIER

(76) Inventor: Lyric Muckleroy, 7944 CR 302, Nacogdoches, TX (US) 75961

( * ) Notice: Subject to any disclaimer, the term of this patent is extended or adjusted under 35 U.S.C. 154(b) by 0 days.

(21) Appl. No.: 10/419,318

(22) Filed: Apr. 19, 2003

(65) Prior Publication Data

US 2003/0200937 A1 Oct. 30, 2003

Related U.S. Application Data

(60) Provisional application No. 60/375,882, filed on Apr. 29, 2002.

(51) Int. Cl.[7] .............................. A01K 1/03; A01K 15/04
(52) U.S. Cl. ........................................ 119/497; 119/725
(58) Field of Search ................................ 119/497, 498, 119/496, 725, 771; D30/109, 151

(56) References Cited

U.S. PATENT DOCUMENTS

| | | | |
|---|---|---|---|
| 750,252 A | * 1/1904 | Bush | 119/497 |
| 2,690,864 A | 10/1954 | Dautermann et al. | |
| 3,150,640 A | 9/1964 | Nevitt | |
| 4,530,309 A | 7/1985 | Collins | 119/496 |
| 4,559,906 A | 12/1985 | Smith | 119/496 |
| 4,644,902 A | 2/1987 | Doyle | 119/497 |
| D290,176 S | 6/1987 | Demeuse | D30/1 |
| D290,178 S | 6/1987 | Nissen | D30/1 |
| D302,610 S | 8/1989 | Slawinski | D30/109 |
| 4,896,630 A | 1/1990 | Luce | 119/496 |
| D311,610 S | * 10/1990 | Dobelle | D30/109 |
| 4,977,857 A | 12/1990 | Slawinski | |
| 5,044,321 A | 9/1991 | Selph | 119/496 |
| D322,695 S | 12/1991 | LaDue | D30/144 |
| 5,148,956 A | 9/1992 | Funk | 224/209 |
| 5,176,102 A | 1/1993 | Tracy | |
| D334,253 S | 3/1993 | Balzarini | D30/144 |
| 5,193,486 A | 3/1993 | Kitchens | 119/496 |
| 5,277,148 A | 1/1994 | Rossignol et al. | 119/497 |
| 5,419,281 A | * 5/1995 | Williams et al. | 119/497 |
| D360,492 S | 7/1995 | Horn | D30/109 |
| 5,445,302 A | 8/1995 | Holtorf | 224/209 |
| D370,090 S | 5/1996 | Coggins | D30/109 |
| 5,531,187 A | 7/1996 | Ward | 119/856 |
| D383,305 S | 9/1997 | Holstrom | D30/216 |
| D387,510 S | 12/1997 | Way | D30/144 |
| 5,823,146 A | * 10/1998 | Alaniz et al. | 119/725 |
| 5,887,772 A | 3/1999 | Dooley | 224/191 |
| 5,894,817 A | 4/1999 | Manuel | 119/497 |
| D424,248 S | 5/2000 | Sommers | D30/109 |
| 6,101,979 A | * 8/2000 | Wilson et al. | 119/725 |
| D442,748 S | 5/2001 | Farrugia | D30/109 |
| 6,286,461 B1 | 9/2001 | Martz | 119/497 |
| 6,481,606 B2 | * 11/2002 | Pickett | D30/109 |

* cited by examiner

Primary Examiner—Michael J. Carone
Assistant Examiner—Elizabeth Shaw

(57) ABSTRACT

A new and improved multi-function pet carrier (12) comprising a flexible panel (1) overlapped perpendicularly by a flexible panel (2). One of the flexible panels (1) can be formed into pockets (8a,b) for carrying needed articles. The other flexible panel (2) can be cushioned. Corners of the panels are connected with adjustable straps (9a,b). Strap combinations are fixed to what are normally corners of the panels (1,2) to form said pet carrier (12) for wearing in a horizontal position on a bearer's body adjacent to an abdomen, a back, over a shoulder, over a shoulder across bearers torso to hip and by a hand. Rings (18a,b) threaded over straps provide tightening of panels to pet's body. Securing straps over a car seat paralled and flush to car seats back (14) provide secure travel for a pet. A Hook and loop type fastener (7) on the pocketed panel (1) provide additional restraint to the pet (11) from shifting in the pet carrier (12).

7 Claims, 5 Drawing Sheets

MULTI-FUNCTIONAL PET CARRIER

This application claims benefit of 60/375,882 Apr. 29, 2002.

FEDERALLY SPONSORED RESEARCH

Not Applicable

SEQUENCE LISTING OR PROGRAM

Not Applicable

BACKGROUND—FIELD OF INVENTION

This invention relates to pet carriers, specifically to pet carriers that are worn by a person to provide hands-free wear and multi-functional use.

BACKGROUND—DESCRIPTION OF PRIOR ART

The use of multifunctional pet carriers is known in the prior art. Pet carriers can be uncomfortable to pets and to the person carrying the pet. The pet carrier should provide a comfortable ride for the pet as well as a secure feeling. When a pet is held close to the person's body and the pet is held securely from the front of the pet to the hindquarters, such as when a person has both hands and arms Wrapped under the pet and around the pet's side, the pet usually is content and comfortable to be held for long periods of time. The pet held this way controls the pet's body movement and creates the security of not falling. The greater area of a pet's body that is supported the greater amount of comfort and security. The underside of the carrier should be soft and simulate the length of a person's arm and hand in a manner that usually the pet is held.

Prior Art shows carriers either worn in front of a person's body or on the person's back. Additional Prior Art also shows means to use shoulder straps or handles. The person can increase their comfort of carrying the pet by being able to change to all various forms of position. As a backpack, as a shoulder carrier, as a handbag and as a pack worn close to the person's abdomen. Wearing the pet close to person's body also keeps the pet calmer, since it simulates the same way a person would hold the pet in their arms. When riding in a vehicle the person can wear the pet adjacent to the abdomen to keep the pet secure in person's lap. For vehicle use the straps can be looped over the headrest or bucket seat to keep pet secured within vehicle.

More specifically, pet carriers heretofore devised and utilized for the purpose of carrying objects are known to consist basically of familiar, expected and obvious structural configurations, notwithstanding the myriad of designs encompassed by the crowded prior art which have been developed for the fulfillment of countless objectives and requirements.

By way of example, box shaped carriers, as in U.S. Pat. No. 5,445,302 to Holtorf (1995) and U.S. Pat. No. 5,277,148 to Rossignol (1994) show carriers worn on the front of a person's body. The containers are cumbersome and can get in the way of the person wearing the carrier. The pet is not supported with-in and as the person leans, bends or turns the pet can slide back to front and side to side. Box shaped containers decrease the person's range of arm movement. Being unable to see directly in front of body when picking up objects as on a table or counter.

U.S. Pat. No. D322,695 to LaDue (1991) and U.S. Pat. No. D334,253 to Balzarini (1993) and U.S. Pat. No. 5,176, 102 to Tracy (1993) and U.S. Pat. No. D383,305 to Holstrom (1997) position the pet in a sitting-up position. This position can be tiring to a pet's spine if carried for long periods of time. The natural position would be to carry pet in a horizontal position keeping pressure off the spine of the pet.

Pet carrier's providing no hindquarters and upper chest support as in both U.S. Pat. No. 4,559,906 to Smith (1985) and U.S. Pat. No. 5,148,956 to Funk (1992) limit the dispersion of the pet's weight to only the torso area. The weight can be more evenly dispersed if the bottom portion of the carrier gave total coverage to the pet across chest, brisket, shoulders, ribcage, stifle, hindquarter and rump.

Upon reviewing U.S. Pat. No. 4,644,902 to Doyle, (1987) the leg openings are restrictive and lack full range of pet's movements hindering pet's circulation. Pockets are small and limit size and number of articles placed within. The strap limits multiple ways carrier can be worn.

Pet Carrier bags such as U.S. Pat. No. 4,977,857 to Slawinski (1990) and U.S. Pat No. D290,176 to Demeuse (1987) provide limited range of movement for pet's legs. While the pet may be warm during cooler climates the pet carriers would be quite hot during warmer climates As in U.S. Pat. No. 5,894,817 to Manuel, (1999) and U.S. Pat. No. 5,193,486 to Kitchens (1993), the pet carrier has straps positioned so that a person can place over one shoulder or hand carried. However they do not allow the pet carrier to also be worn on the front of the body and on the back. Elastic ribbons or bands are used around the legs and torso in said patent to Manuel. After continual wear the elastic will lose elasticity and is not as durable when washed and put in a hot dryer. Pet carriers will eventually have the need of cleaning and the materials of the carrier should be washable and dryer friendly. The pet carrier is limited to being worn on person's shoulder and by hand. The main support is to the pet's ribcage lacking support to the hindquarters and rump.

Finally, in the scope of my search, there is no other previous developed pet carrier that provides all of the multi-functional uses and the secure comfort of the cushioned and pocketed bone-shaped panels with crisscrossed straps. In this regard, the present invention substantially fulfills this need.

Objects and Advantages

Accordingly, besides the objects and advantages of the multi-functional pet carrier described in my above patent, several objects and advantages of the present invention are:
(a) to provide multiple positions that a pet carrier can be worn.
(b) to provide enhanced comfort experienced during the pet bearing process for the bearer
(c) to provide enhanced comfort for the pet while being carried.
(d) to provide a secure means of carrying a pet borne by a person or interfacing with a vehicle's car seat.
(e) to provide a hands-free carrier.
(f) to provide spinal support to a pet while carried.
(g) to provide storage of articles needed by the bearer or the pet.
(h) using materials that are washable and dryer friendly.
(i) using fabrics that are reversible for style considerations.
(j) using fabrics that are considered for climate.
(k) using cushioning materials that provide warmth or arthritic pain relief.
(l) Providing a simpler means to construct to use and manufacture economically.

These together with further objects and advantages will become subsequently apparent with a study of the following description and the accompanying drawings, references being had to the accompanying drawing forming a part hereof, wherein like numerals refer to like parts throughout.

SUMMARY

In accordance with the present invention a multi-functional pet carrier comprising a pocketed bone shaped panel of suitable flexible material, a cushioned bone shaped panel and elongated flexible straps or ropes attached at opposite corners respectfully.

DRAWINGS

Drawing Figures

REFERENCE NUMERALS IN DRAWINGS

| 1 a, b | Pocketed panel | 11 | Pet |
|---|---|---|---|
| 2 a, b | Cushioned panel | 12 | Pet Carrier |
| 3 a–h | Grommets | 13 | Pet Bearer |
| 4 | Fore end | 14 | Car Seat |
| 5 | Aft end | 15 | Headrest |
| 6 | Torso support | 16 | Throat Opening |
| 7 a, b | Hook and loop | 17 a–d | Leg Openings |
| 8 a, b | Pocket | 18 a, b | Rings |
| 9 a, b | Strap | 19 | Cushioned Filling |
| 10 a–d | Strap end | | |

DETAILED DESCRIPTION

Figure 1:
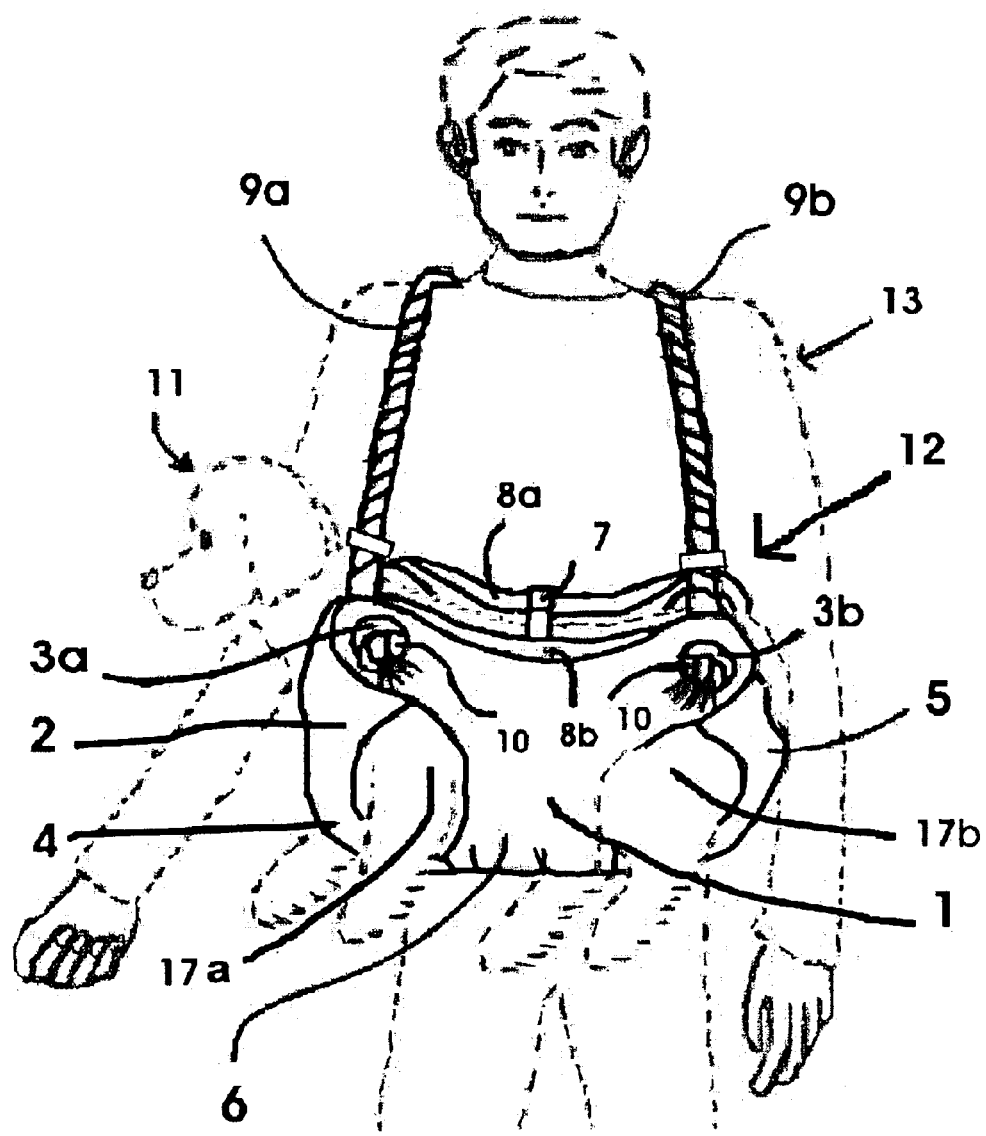
FIG. 1 is a perspective view of preferred embodiment of the multi-functional pet carrier in its front positioned mode with pet being borne on the abdomen, taken from a position facing the carrier's left side panel constructed in accordance with the invention. Person and dog are shown in phantom.

Description—FIG. 1 Preferred Embodiment

Figure 7:
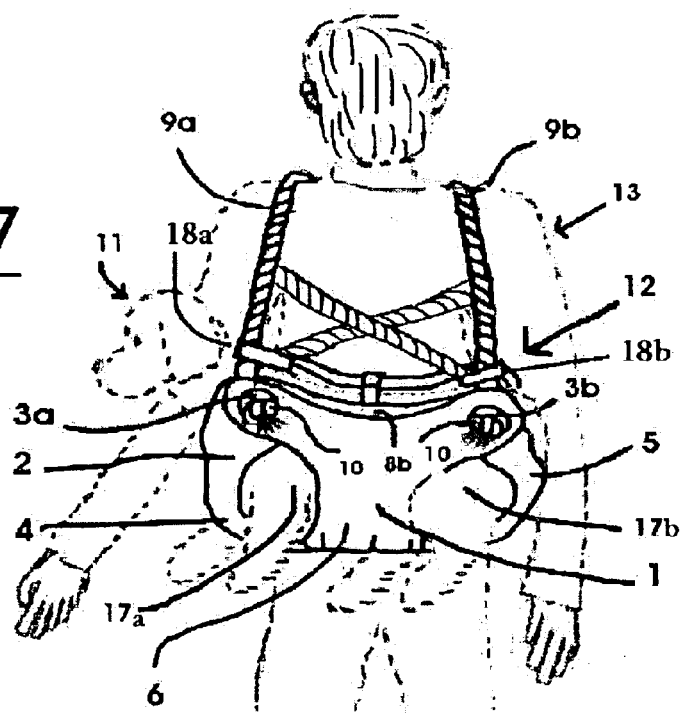
FIG. 7 is a perspective view of one embodiment of the multi-functional pet carrier worn in the backpack mode.
Figure 8:
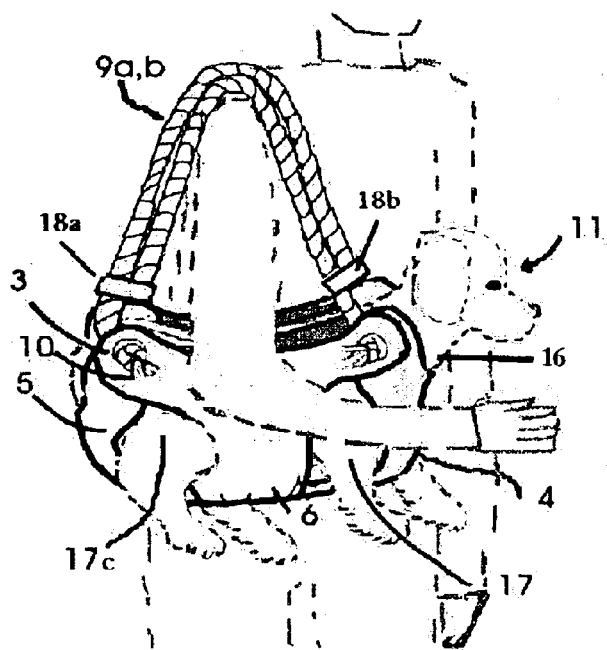
FIG. 8 is a perspective view of one embodiment of the multi-functional pet carrier worn in the shoulder mode.
Figure 9:
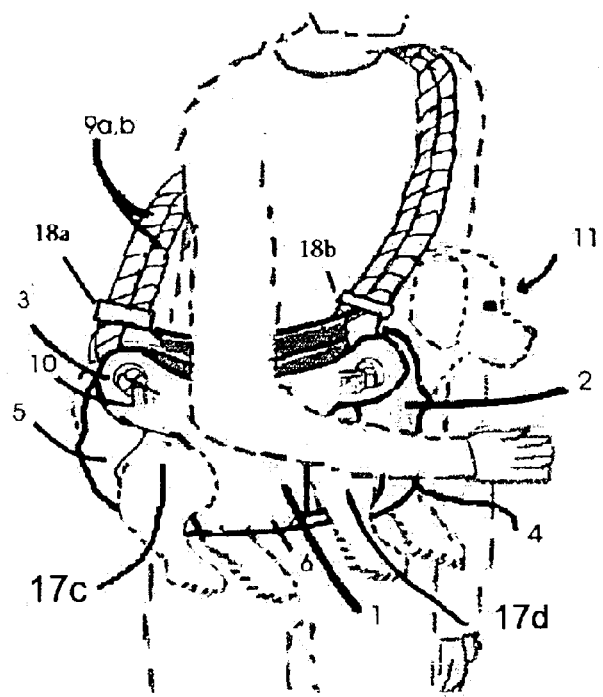
FIG. 9 is a perspective view of one embodiment of the multi-functional pet carrier worn in the shoulder across torso to hip mode.
Figure 10:
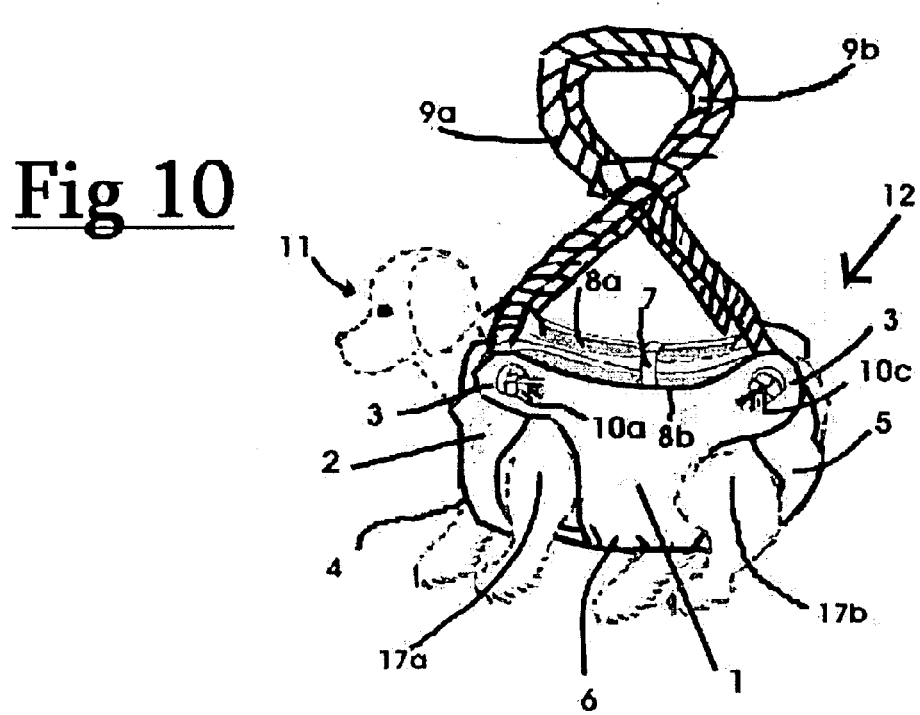
FIG. 10 is a perspective view of one embodiment of the multi-functional pet carrier worn in the handheld mode.

The multi-functional pet carrier 12, shown in FIG. 1, is designed to bear a pet in multiple modes such as a backpack FIG. 7, on the abdomen FIG. 1, over one shoulder FIG. 8, over shoulder across torso to hip FIG. 9, and with one hand FIG. 10.

Figure 11:
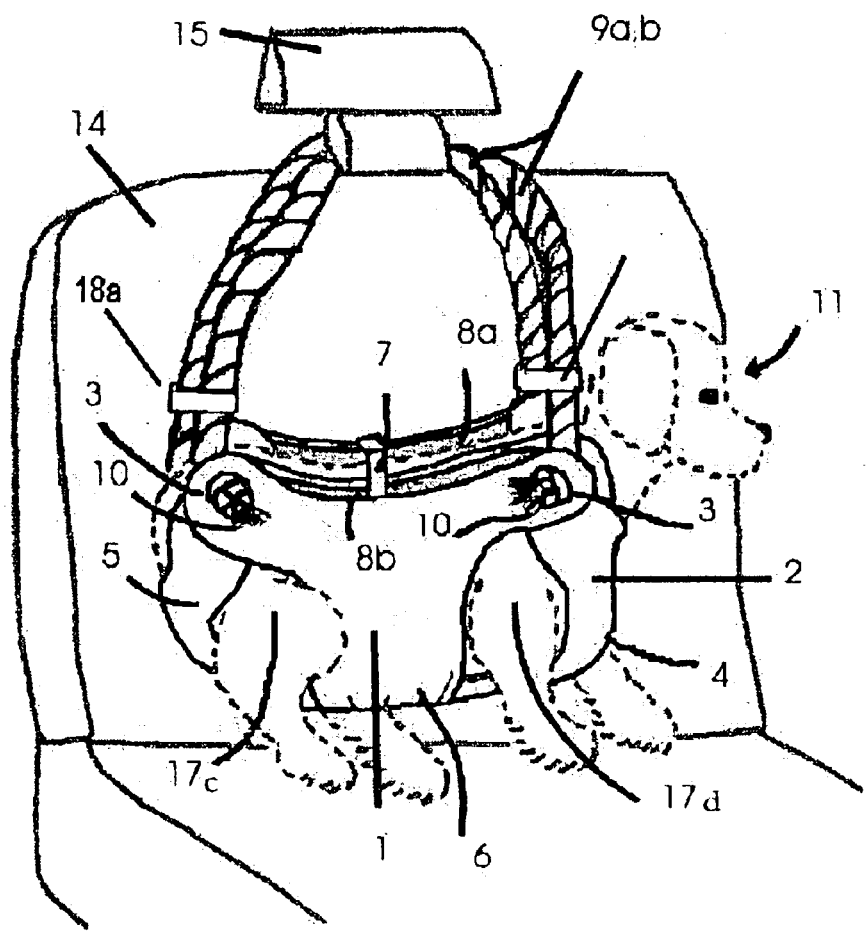
FIG. 11 is a perspective view of one embodiment of the multi-functional pet carrier secured to the seat of a vehicle.

The multi-function pet carrier 12, can interface with a car seat 14 of a vehicle as seen in FIG. 11.

Figure 2:
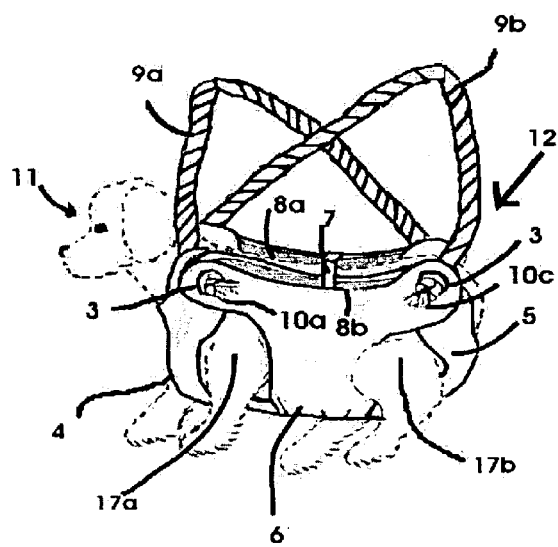
FIG. 2 is a perspective view of the present invention illustrated of the multi-functional pet carrier constructed in accordance with the principles of the present invention
Figure 3:
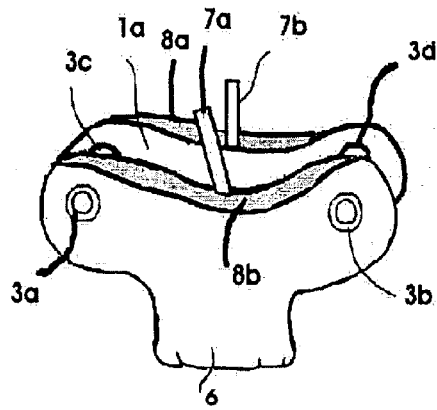
FIG. 3 is an enlarged perspective view of the pocketed panel.
Figure 4:
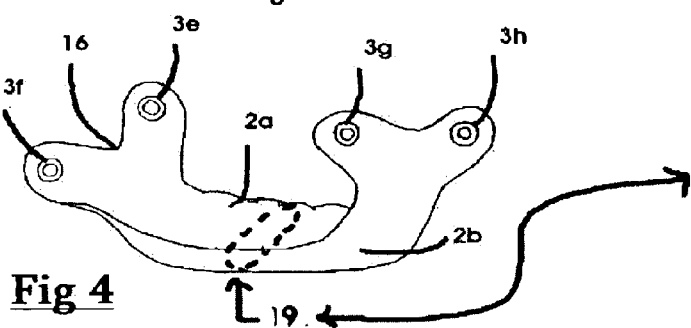
FIG. 4 is an enlarged view of the cushioned panel.

Multifunctional pet carrier 12 (FIG. 2) has a bone-shaped panel 1 (FIG. 3) including a left pocket 8a, a right side with pocket 8b, and a bottom torso support 6. Each corner of the panel has a connecting means such as a grommet 3. To assemble the pet carrier 12, the pocketed bone-shaped panel 1 is laid on a flat service in a vertical position. The cushioned bone-shaped panel 2 (FIG. 4) with the same connecting means 3 is laid perpendicularly in a horizontal position on top of said pocketed panel 1.

Figure 6:
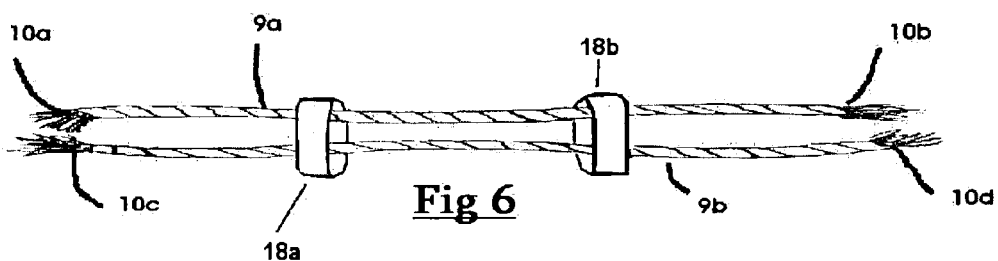
FIG. 6 is an enlarged view of the straps and rings.

Two elongated flexible straps 9a,b (FIG. 6) are provided. Preferably, the hooking means are grommets 3, mounted in respective corners of panel 1 and panel 2, whereby said straps 9a,b are threaded through a corner of panel 1 and a corner of panel 2 and said strap end 10 is tied in a knot to form a means to secure and to adjust said straps 9a,b.

The free end 10a of the strap 9a is fixedly attached to linking means 3, which said strap 9a is received and which is adjustable along substantially the length of said strap 9a. The other free end 10b of said strap 9a is crisscrossed to other corners fixedly attaching to linking means 3. The second strap 9b is attached to the connective corners in same manner as strap 9a.

When in use, a pair of fore leg openings 17a,b and a pair of hind leg openings 17c,d, all symmetrically disposed relative to panel 1 and panel 2 are formed.

The fore-end of the cushioned bone-shaped panel 2 form a throat opening 16 (FIGS. 4,8) for freely accepting the pet's throat and head. The aft rump-end 5 (FIGS. 4,8) of cushioned bone-shaped panel 2 form a gentle secure support of the weight of the hindquarters.

In fact, I have found that the cushioned panel 2 (FIG. 1) extending from pet's brisket under the shoulders, ribcage, stifle and up over the rump and tail provide a gentle secure support evenly distributing the pet's entire body weight proportionately.

Figure 5:
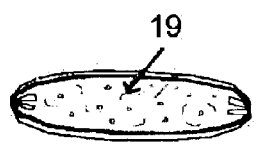
FIG. 5 is a section view of the cushioned filling inside panel 2.

Desirable, panels 1 and 2 have double walls when sewn to form pockets 8a,b in panel 1 and cushioning (FIG. 5) inserted in panel 2.

In the preferred embodiment illustrated in FIG. 1, the pet is carried in an abdominal position where the pet 11 is carried close to the bearer 13 for a gentle secure ride. Allowing the bearer to stroke and reassure the pet when desired and to reach articles placed into pockets 8a,b easily.

FIGS. 6–10—Additional Embodiments

FIG. 7, When in use, the pet carrier's 12 backpack mode, the pet carrier 12 is placed on the bearers back inserting the bearer's arms by looping straps 9a,b over the shoulders crisscrossing the straps 9a,b across the bearers back. Resting the pet 11 and carrier 12 on the lower back where it is most comfortable by adjusting straps 9a,b through a means of repositioning and tying the strap ends 10.

FIG. 8, When it is desired to use the pet carrier 12 in a shoulder mode, place both of the straps 9a,b over one shoulder.

FIG. 9, When it is desired to use the pet carrier 12 in a shoulder across the bearers torso to hip mode, insert the bearers head through both straps 9a,b, cross straps 9a,b across the torso in front and back allowing the pet to rest against abdomen or hip of bearer.

FIG. 10, When it is desired to use the pet carrier in a handheld mode, tie both straps 9a,b into a knot forming a loop in the straps 9a,b. Insert finger into the loops formed. This is very useful when taking the pet 11 from home to vehicle or into a location when transferring pet to another person.

FIG. 11, When it is desired to use the pet carrier 12 in a vehicle. The said carrier's straps 9a,b are looped over the headrest 15 of a car seat or the back of a bucket seat 14 which lacks the headrest. The pet 11 is secured and will be from movement in the vehicle's interior providing safety to car passengers and to the pet 11.

Not shown, is the pet carrier 12 being worn as in the preferred embodiment FIG. 1 while a passenger is riding in a vehicle. This mode keeps pet restrained and secure in the passenger's lap.

Alternative Embodiments

Although not shown in the drawings, the hook end latch fasteners mechanism 7a,b or buckle may be replaced with conventional snaps (or preferably, a series of snaps) to securely and adjustably restrain the pet carrier 12 in place about the small animal.

Also not shown in the drawings, is a liner that can be placed in the interior of the pet carrier and secured to the sides for the transport of a new born pet that is not of the normal size of a full grown pet. This liner will also provide for the pet's continued growth until said pet can insert leg's through the leg openings 17 comfortably. The liner should be of a soft cushioned fabric for comfort and will cover the leg openings to enclose for a solid bottom and sides.

Advantages

From the description above, a number of advantages of my multi-functional pet carrier become evident:

(a) typically dogs become quite docile while wearing the pet carrier of the present invention.
(b) the weight of the pet's body is spread substantially evenly along the length and the width of the pet carrier creating distribution of the animal's weight close to the bearer and centered for balance.
(c) even support eliminates pain that other wise occurs in the concentrated areas of lifting force.
(d) Increased carrier mode
(e) The structural shape of a bone lends itself to the new and improved way that a pet carrier can be formed.
(f) The two bone shaped panels when overlapped perpendicularly and attached at the corners from a pet carrier with four sides and four leg openings.
(g) The use of a group of cushioning would include fiber, gel, water, air or other such means for the panel under the torso of the pet for supporting the pets spine from the neck to the rump.
(h) The cushioned panel will be softer to the pet's genital and rump area.
(i) By crisscrossing the flexible adjustable straps or tope to opposite corners respectfully the weight of the pet is distributed across the bearer's back and shoulders creating more comfort The foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling with the scope of the invention.

It will be appreciated that the desired objectives of this invention have been successfully accomplished by virtue of relative simplicity, flexibility, versatility, and ease and economy of fabrication.

Operation—FIGS. 1, 7, 8, 9, 10, 11

FIG. 1—To carry about a pet, a person places each arm through the straps and across their back dangling the pet carrier in the front of their body. Picking up the pet and placing each leg in it's respective leg opening. The head will then rest between one end of the carrier and the aft end of the carrier then supports the hindquarters of the pet. It is suggested to gently position the pet's tail for comfort within the pet carrier so that the pet's genitals are undisturbed. Secure the hook and loop tape to each other bringing the sides closer to the pet's body to prevent pet from shifting if the person bend's or moves quickly. Slide one ring on the straps to the back of the neck and one ring towards the rump to tighten the pet carrier close about the pet's body. At this time the length of the straps can be adjusted for position and comfort or prior to wearing the pet carrier. The pet is now securely held and may be transported by the person walking, running, riding a recreational vehicle or the like, since the hands are now free to carry out other functions.

FIG. 7—To change the position of the pet carrier to the back, leave the pet remaining in the carrier, remove the arms holding the straps of the carrier together at a distance above the pet carrier to place arms through the straps and position the pet carrier across the back.

FIGS. 8, 9—To change to a shoulder mode, the person removes each arm again holding the straps together above the body of the pet and then places both straps over one shoulder or over the shoulder and across the torso of the person with pet resting against the person's side or abdomen.

FIG. 10—To change to a hand-held apparatus the straps are held together above the pet's body and looped and tied to form a handle closer to the pet's body and then lifting with the hand and carried in such fashion.

FIG. 11—To place the pet in a vehicle, the straps are held together and looped over the head rest of the vehicle's car seat.

The reversible two-sided panels can be changed to one side or the other depending on the fabric style they wish to incorporate with their own clothing.

Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

Conclusions, Ramification and Scope

According, the reader will see that the multi-functional pet carrier of this invention can be used easily and conveniently increasing modality, comfort and security. In addition, the cushioned bone-shaped panel gives support and comfort to the pet's chest, stifle, ribcage, hindquarters and rump while keeping the dog's body disposed generally parallel with the ground, thereby eliminating any strain on the dog's vertebrate. The pocketed bone shaped panel provides storage for articles such as cell phones, key, wallet, pet's treats or any articles that the user deems important to carry. The user then has less to carry in the way of a handbag or backpack providing user a hands free means to carry pet with no obstructions.

Furthermore the multi-functional pet carrier has the additional advantages in that:

it permits the production of pet carriers in a variety of fabrics that will meet a region's climate thereby adding to a pet's comfort.

It allows the fabrics to be of varying design to add to the stylish needs of a person.

It permits the uses of varying cushioning giving relief to pet's spine or joint pain.

It allows the rope straps to be of unlimited lengths to accommodate a person's shoulder, back and waist girth.

It provides evenly distributed support of the pet by attaching the straps on opposite sides of the pet carrier respectfully.

Although the description above contains many specifications, these should not be construed as limiting the scope of the invention but as merely providing illustrations of some of the presently preferred embodiments of this invention. For example the pet carrier's panels can have other shapes, such as rectangular, the alphabet letter shape 1, etc.; the straps can be attached with buckles or hook and loop and be ergonomic in shape with cushioning added for greater support and comfort.

Thus the scope of the invention should be determined by the appended claims and their legal equivalents, rather than by the examples given.

I claim:

1. A multi-functional pet carrier comprising:

a pair of underbelly panels, each made of fabric, each having y-shaped portions at each end, crisscrossed to have a bottom side-to-side panel and a top front-to-rear panel;

a set of four grommets attaching adjacent bottom panel corners of y-shaped ends to top panel corners of y-shaped ends, wherein forming two side walls, a front wall, a rear wall, a bottom;

a pair of ropes each having a first end and a second end, one of said ropes is threaded through two of said grommets from front to back and left to right of y-shaped portions at each end, then second of said ropes is threaded through grommets from front to back and right to left of y-shaped portions at each end, knotting each of first ends individually and each of second ends individually;

a pair of slip rings made of plastic, wherein first end of ropes are threaded through one of said slip rings before attaching ropes through grommets, said second ends then threaded through second slip ring before attaching ropes through grommets, wherein said slip rings slide down ropes tightening panels toward pet's neck and tail end;

a hook and loop closure stitched to the center of each y-shaped end of bottom side-to-side panel for tightening panel closer to pet's torso, whereby, said ropes can be placed in multiple positions about a person's shoulders, carried by hand, or placed over a car seat's headrest.

2. The multi-functional pet carrier as defined in claim 1, wherein said side-to-side panel comprising a top sheet of material stitched to a bottom sheet of material on the elongated edges leaving ends open to form pockets.

3. The multi-functional pet carrier as defined in claim 1, wherein said front-to-rear panel comprising a top sheet of material stitched to a bottom sheet of material sandwiching fiberfill material.

4. The multi-functional pet carrier as defined in claim 1, wherein said front-to-real panel comprising a top sheet of material attached by sealing edges to a bottom sheet of material with a means of filling with a gel material for cooling and heating.

5. The multi-functional pet carrier as defined in claim 1, wherein said front-to-rear panel comprising a top sheet of material attached by sealing edges to a bottom sheet of material with a means of filling with water for cushioning.

6. The multi-functional pet carrier as defined in claim 1, wherein said front-to-rear panel comprising a top sheet of material attached by sealing edges to a bottom sheet of material with a means of filling with air for cushioning.

7. The multi-functional pet carrier as defined in claim 1, wherein said ropes and grommets are substituted with fiber webbing for straps and buckles attached at corners of y-shaped ends of panels threading said straps through buckles.

* * * * *